Sept. 8, 1953

G. C. HARTLEY 2,651,679

ELECTRIC SIGNALING SYSTEM

Filed Feb. 4, 1948

3 Sheets-Sheet 1

INVENTOR.
G. C. HARTLEY
BY Robert Harding Jr.
ATTORNEY

Sept. 8, 1953

G. C. HARTLEY

ELECTRIC SIGNALING SYSTEM 2,651,679

Filed Feb. 4, 1948

3 Sheets-Sheet 2

INVENTOR.
G. C. HARTLEY
BY Robert Harding Jr.
ATTORNEY

INVENTOR.
G. C. HARTLEY
BY Robert Harding Jr.
ATTORNEY

Patented Sept. 8, 1953

2,651,679

UNITED STATES PATENT OFFICE 2,651,679

ELECTRIC SIGNALING SYSTEM

George Clifford Hartley, London, England, assignor to International Standard Electric Corporation, New York, N. Y., a corporation of Delaware Application February 4, 1948, Serial No. 6,329
In Great Britain February 7, 1947

1 Claim. (Cl. 179—16)

This invention relates to electric signalling systems and more particularly though not exclusively to signalling and dialling over long distance telephone circuits by means of frequencies within the voice band. There have been employed in recent years many schemes using such frequencies and there are a number of common problems which must be solved if a scheme is to be completely satisfactory. One of these is the need to ensure that signals do not proceed over the speech path beyond the point where they are intended to have effect and cause interferance with similar system at a remote point e. g. at the end of an international line. This has been solved by the prefix splitting technique. A further problem is the need to keep the forward line screened from speech and other sources of interference at the time when the remote receiver is in the condition to receive impulses in order that false impulses shall not be created. This has been achieved in various ways such as delaying the establishment of the forward speech path until receipt of the answer signal. These are not very desirable and the safest answer for general application is the use of "prefixed impulsing" i. e. the introduction of a prefix of a type giving a high degree of voice immunity, see British Patent No. 534,023.

Hitherto the prefixing of signals has involved appreciable delay in signalling and by virtue of its length the prefix has rendered difficult the direct translation of simple D. C. signals into V. E. and vice versa. Further the prefixing of impulse trains has necessitated the use of impulse regenerators to secure adequate time margins.

With improved receiver designs and the use of higher frequencies and appropriate guard circuits the length of the prefix needed is becoming much reduced.

Figure 1:
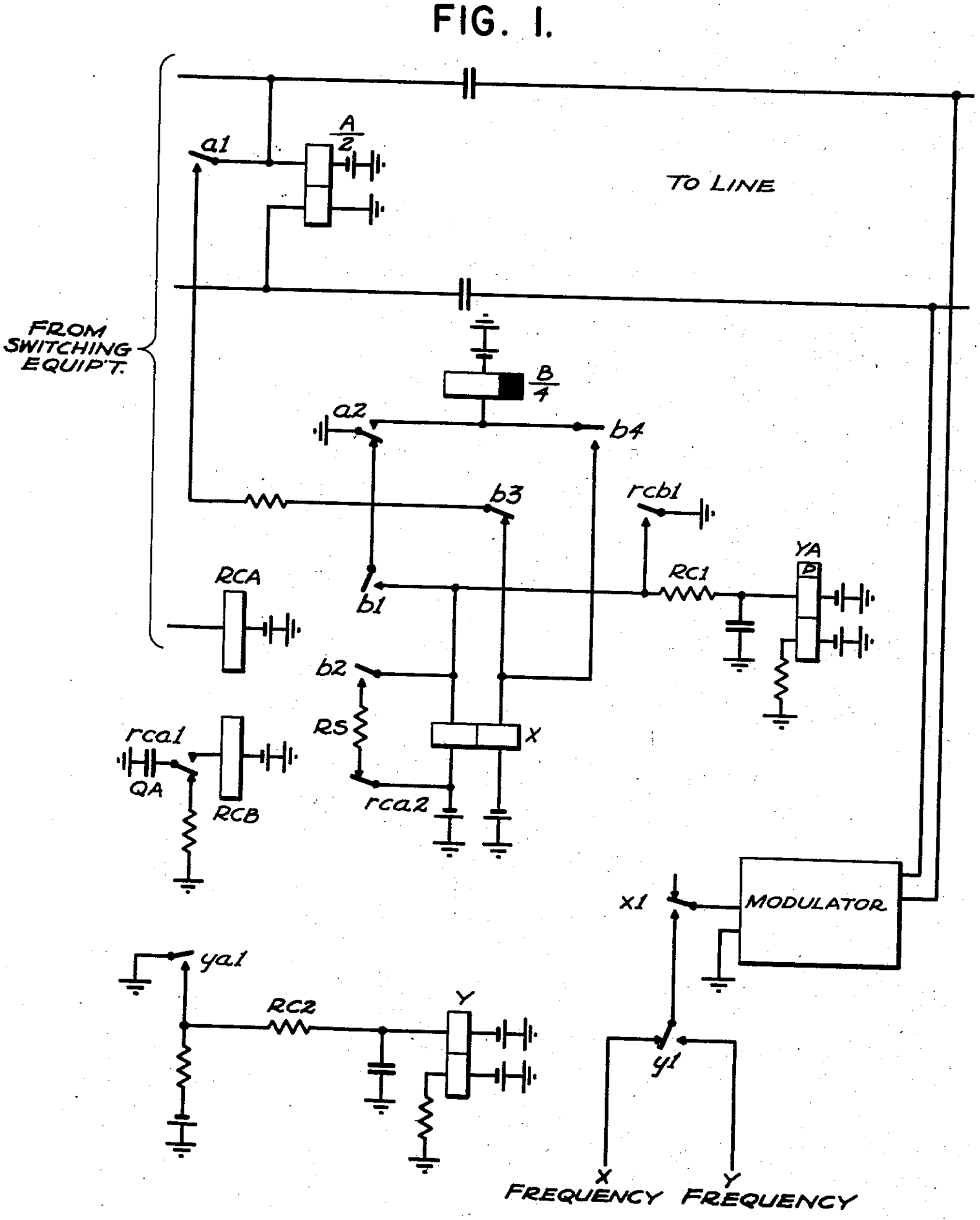

According to the present invention therefore, one feature is a signal translating means operable to receive D. C. or low frequency selective trains of signals and to transmit them without previous storage in the form of trains of voice frequency signals. This and other features of the invention will become apparent from an understanding of the following description of one embodiment thereof which is to be read in conqunction with the accompanying drawings in which:

Fig. 1 shows the essential elements of a sending relay set for a two-frequency (X, Y) signal code.

Figure 2:
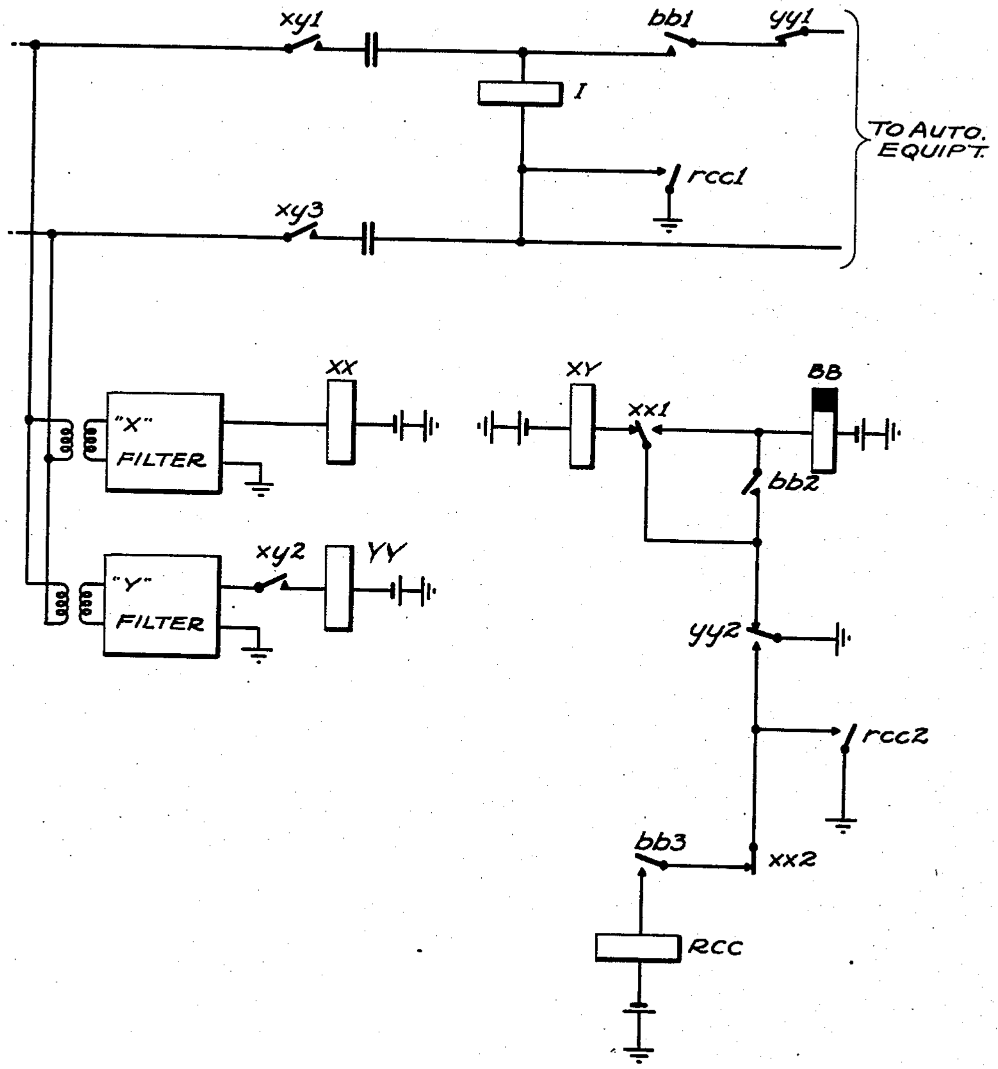
Figure 3:
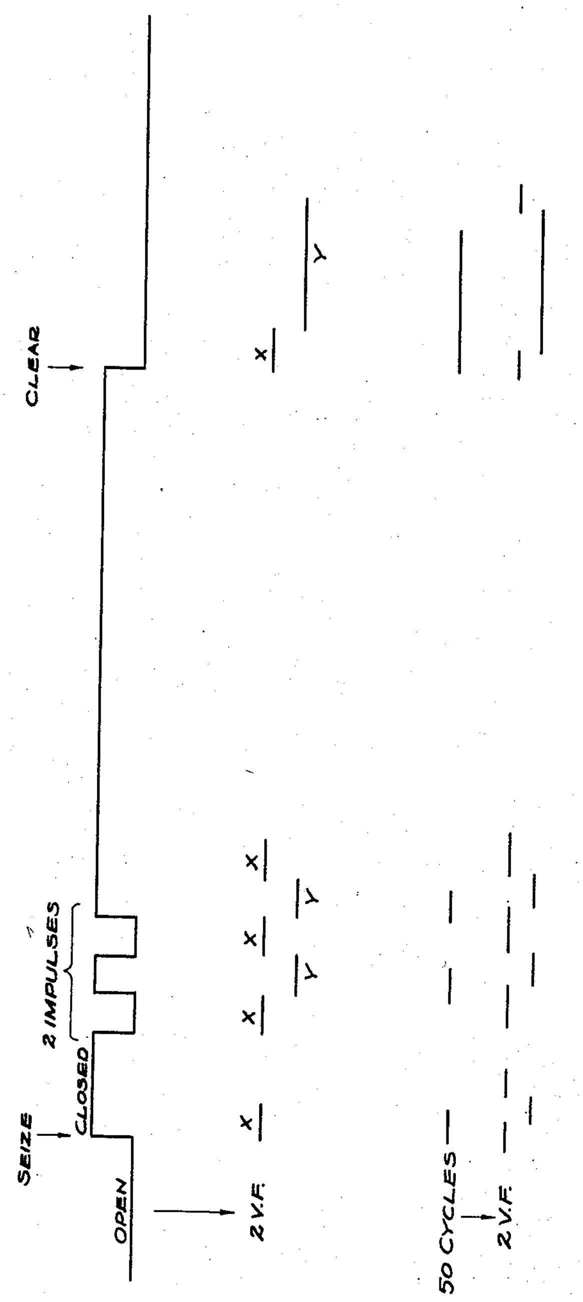

Fig. 2 shows the essential elements for the corresponding receiving relay set, while Fig. 3 shows D. C. and 50 cycle signals, and their translation to V. F. signals.

Relay A is the familiar line relay of automatic systems and B is the associated slow guard relay.

X and Y are relays which control the connection to the line (in this example via the carrier modulator) of the "X" and "Y" frequencies respectively.

When the circuit is seized, A operates and during B's operating time X is energised via its right-hand winding *b4* break, *a2* make. A pulse of X frequency is sent to the modulator via *y1* break, *x1* make.

When impulsing starts, X is again operated as soon as A releases but this time via *a2* break, *b1* make, left-hand winding of relay X. Contacts *x1* make connect X frequency to the line. After a delay introduced by a resistance-capacity network RC1, relay YA, which is polarised and biassed in telegraph fashion, operates via *b1* make, *a2* break and after a further interval determined by the second resistance-capacity network RC2, Y operates and replaces X tone by Y at *y1* make. The release of YA due to reoperation of A is also delayed by RC1 to the same extent as its operation. X remains up throughout the digit as it is made to release slowly by shunt resistance RS but Y follows the impulses with a phase difference controlled by the R/C networks, and without distortion. D. C. dial impulsing timing is of the order of 33 milliseconds break and 66 milliseconds make. The delay networks RC1, RC2 will give delays of the order of 15 milliseconds each or 30 milliseconds combined. The release delay of relay X due to RS is of the order of 60–100 milliseconds.

At the end of impusing the tone returns to X during the release of relay X, which although initiated by contacts *a2* break in common with YA and Y is delayed 30 milliseconds or more after their release. The translation of D. C. impulses to V. F. prefixed pulses is indicated in the upper two rows of Fig. 3.

On release by the calling party, A falls back as in dialling and X, YA and Y operate in sequence. Y however, remains up till B releases and a long "Y" pulse is therefore transmitted. The opening by B of the X relay resistance shunt RS as well as the operating circuits of X and YA causes X to release quickly before YA and Y. Thus the X tone is not renewed. Translation of the release signal is also shown in Fig. 3.

Relays RCA and RCB are adapted to send a third type of signal such as may be wanted for operator recall facilities. If RCA is operated, the condenser QA causes RCB to operate for a predetermined period. Contact *rcb1* causes X, YA and Y to operate exactly as in sending an impulse and a short signal is sent. Contacts *rca2* however disconnect the X relay shunt RS thereby causing it to release quickly and suppressing the momentary return to X frequency.

Fig. 2 shows the elements of a receiving relay set. Relays XX and YY are operated through band pass filters XBPF and YBPF, respectively, which filters are coupled to the line and are responsive to the "X" and "Y" tones, respectively, and which cause operation of the XX and YY relays by the receiver on receipt of the appropriate tones without spurious frequencies. Relay XY is normally operated via *xx1* break, *yy2* break, ground. When an X prefix is received changeover of contacts *xx1* releases XY and its contacts *xy1* contacts *xy1* and *xy3* open circuit the line beyond the point of attachment of the receiver so as to achieve "splitting" and avoid the passing of any further signal elements. XY also carries a make contact *xy2* to control the receiver and allow YY to operate.

The first operation of XX causes BB to operate via *xx1* make, *yy2* break and lock via *bb2* make, *yy2* break. Short operations of YY as in impulsing or the receipt of the third type of signal do not release BB due to the slow release character of relay BB. The long operation of YY on calling party release does however cause BB to release since it exceeds the release time of relay BB and in turn releases the connection. The operation of YY on impulses brings about impulse repetition via the break contact *yy1* in the line. The control of YY by XY governed by prefix prevents false impulsing on speech or noise. The closure of *xy2* causes the bias potential of the Y frequency valve at the V. F. receiver to be modified so as to allow the valve to operate on receipt of *y* frequency.

The signal X—Y with no return to X will cause RCC to operate by virtue of XX releasing before YY. RCC locks via *bb3* make, *xx2* break, *rcc2* make. Any subsequent operation of XX will unlock this condition.

These sketches show application of the idea to forward signals in an auto call. Backward signals such as "answer" and "clear" are achieved by basically the same technique, but the delay arrangement may be simpler in that it is not necessary to achieve distortion-free impulsing. For instance, a single telegraph relay with longer delay might be used.

It will be seen that the delay networks operate to displace both the beginning and the end of the Y impulses by the same amount, so that the impulses are of the same length as the dial break impulses but displaced by about 30 milliseconds, with respect thereto.

If the inter-related system is not D. C., but 50 cycles, the sending circuit can be even simpler. The long and short impulse of 50 cycles would be arranged to correspond to long and short "A" release periods. They would therefore be repeated without distortion but with the required prefix.

A possible translation of 50 cycle impulsing and release signals is indicated in Fig. 3.

Amplifier means may be introduced between RC1 and YA (Fig. 1), e. g. a hard valve, amplifier, a trigger circuit, or a balanced amplifier.

Any desired type of delay device may be used instead of RC1, RC2, e. g. a delay line.

The above scheme shows an arrangement in which the X relay remains operated throughout the repetition of a digit, and the third type of signal is produced by ensuring that X is released before Y. In order to reduce the amount of signalling tone on the line. so as to avoid overloading carrier amplifiers, it might be preferable to arrange that the X relay was normally released after sending the initial prefix of a digit, there being no tone on the line between Y pulses which however will be phase-displaced as before: and no return to X tone at the end of a digit. The third type of signal could then be distinguished from a single impulse by causing X to hold up and giving a short return to X after the short Y pulse.

It would be possible to reduce the signal time still further by arranging that YA and Y when operated, shunted the condensers of the respective delay-networks so that the relays released without delay. In this way the dial break periods of about 66 milliseconds would be translated into Y pulses of about half that length.

What is claimed is:

A signalling system for telecommunication systems comprising first and second exchanges, a transmission line connecting said exchanges, a transmitter at said first exchange, a line seizure relay at said first exchange operatively responsive to D. C. or low frequency selective trains of signals originating at said first exchange, relay means in said transmitter controlled by said line seizure relay, circuit means in said transmitter controlled by said relay means operative to transmit selective trains of voice-frequency signals to said second exchange corresponding in time duration to said low frequency signals, means at said first exchange for transmitting a preparatory signal to said second exchange, said preparatory signal being of a different frequency than said selective voice-frequency signals, delay means in said circuit means operative to delay operation of said relay means subsequent to transmission of said preparatory signal, thereby displacing said transmitted selective voice-frequency signals with respect to the corresponding low frequency signals an amount dependent on said delay means, said relay means including means operative to permit the marking of periods between successive transmitted selective signals with said different frequency and means operative to mark the termination of a train of selective signals by a signal of said different frequency, a receiver at said second exchange operable to receive said voice-frequency signals and means in said receiver responsive to predetermined of said voice-frequency signals for retranslating said signals into trains of D. C. selective signals.

GEORGE CLIFFORD HARTLEY.

References Cited in the file of this patent

UNITED STATES PATENTS

| Number | Name | Date |
|---|---|---|
| 2,124,027 | Calhoun | July 19, 1938 |
| 2,153,654 | Trechcinski | Apr. 11, 1939 |
| 2,164,335 | Mathes | July 4, 1939 |
| 2,282,129 | Hadfield | May 5, 1942 |
| 2,288,251 | Murphy | June 30, 1942 |
| 2,317,191 | Holbrook | Apr. 20, 1943 |
| 2,358,145 | Christian | Sept. 12, 1944 |
| 2,367,518 | Newby | Jan. 16, 1945 |
| 2,407,150 | Gillings et al. | Sept. 3, 1946 |
| 2,424,577 | Mauge | July 29, 1947 |
| 2,594,719 | Beale | Apr. 29, 1952 |

FOREIGN PATENTS

| Number | Country | Date |
|---|---|---|
| 350,900 | Great Britain | June 10, 1931 |
| 489,545 | Great Britain | July 25, 1938 |
| 499,822 | Great Britain | Jan. 27, 1939 |
| 572,002 | Great Britain | Sept. 18, 1945 |